June 25, 1968 D. SILVERMAN Re. 26,416

EXAMINING-SORTING SYSTEMS

Original Filed April 2, 1962 4 Sheets-Sheet 1

INVENTOR.

Daniel Silverman

June 25, 1968 D. SILVERMAN Re. 26,416

EXAMINING-SORTING SYSTEMS

Original Filed April 2, 1962 4 Sheets-Sheet 2

INVENTOR.

Daniel Silverman

EXAMINING-SORTING SYSTEMS

Original Filed April 2, 1962 4 Sheets-Sheet 3

INVENTOR.

Daniel Silverman

INVENTOR.

Daniel Silverman

United States Patent Office

Re. 26,416
Reissued June 25, 1968

26,416
EXAMINING-SORTING SYSTEMS

Daniel Silverman, 5969 S. Birmingham,
Tulsa, Okla. 74105

Original No. 3,187,893, dated June 8, 1965, Ser. No. 184,282, Apr. 2, 1962. Application for reissue June 7, 1966, Ser. No. 562,046
35 Claims. (Cl. 209—111.7)

Matter enclosed in heavy brackets [ ] appears in the original patent but forms no part of this reissue specification; matter printed in italics indicates the additions made by reissue.

This invention relates to the art of inspection of granular materials. More particularly it relates to those machines used for the inspection, sorting, and selection of granular, pelletized or unitized materials such as grains, peas, beans, fragments of nut meats, powdered materials and such, although it is not limited in any way to specific materials or to edible materials.

In the preparation of food products, it is generally customary to examine the raw materials and to sort out all defective grains or pieces, and all foreign material and other debris. This sorting is generally done on the basis of color, although it can be done on the basis of other physical properties. Each piece or grain is picked up mechanically, generally pneumatically) and displayed in front of a photoelectric detector sensitive to color. Those of proper color are deposited in an appropriate container. Those not of the proper color are rejected. In the present art, the grains or particles are handled on an individual basis, in a single column along the rim of a wheel, by placing them over an opening leading to an evacuated space. Thus they must be of sufficient size to cover the openings. The present system would thus not work for very small grains such as crystals of salt, sugar, medical or chemical compounds, or other materials, or for coarsely ground grain foods, or finely ground powders such as flour. While this present invention is designed to handle such fine materials as flour, it is by no means limited to that class of material, and the principles can be applied to the handling of large grains or particles up to the size of peas, beans or larger grains, all at a much higher rate of inspection than the present system permits.

The principle of what I propose can best be described in terms of a rotating drum, preferably driven at constant speed. Granular material is applied to the surface of the drum to form a more or less continuous two-dimensional layer. I speak of "granular" material or "grains," simply for convenience and the words "grains" and "granular" have no limitation to food grains, but may constitute any type of particles of whatever shape down to the size of powders. The grains to be inspected are held to the surface of the drum, preferably by electrical forces, although mechanical or pneumatic forces may be used. The grains on the surface of the drum are scanned optically, such as by a moving spot of light. Synchronized wth the spot scanner is a spot rejector. This is a "point" rejector. That is, the rejector mechanism can be directed to a small spot or area of the surface of the drum. Thus, when the scanner sees a defective grain at any specific point along its scan line, then as the drum turns so that the angle of the drum is correct and the scan line is now under the sweep of the rejector, the spot rejector will be lined up with the defective grain at the same position and will reject it.

The grains can be held to the surface of the drum by electrostatic, mechanical or pneumatic means, and the rejection can be by electromechanical, electrostatic or pneumatic means, etc. By using a drum with considerable surface area, and by using electrical methods of rejection, the rate of inspection can be increased to the point where inspections which are not now economic can be handled on an economic basis.

Thus, it is a primary object of this invention to provide a cheap and rapid method of inspection, and rejection of defective units, of granular or powdered materials. Further important objects of this invention can be listed as follows: To handle finely ground materials; to handle materials of various physical properties; to operate on an area scan basis instead of a line scan basis; to inspect and reject on the basis of more than one physical property; to sort into more than two categories of a specific property.

In order to facilitate an understanding of other and further objects and the principles of my invention, reference will be made to the several embodiments thereof illustrated in the accompanying drawings forming part of this application. Although specific language will be employed, it will, nevertheless, be understood that various further modifications of the device illustrated herein such as would fall within the province of those skilled in the art to construct are contemplated as part of the present invention. In the drawings:

FIGURE 1(a) and FIGURE 1(b) together show a schematic illustration in plan and elevation of one embodiment of my invention, including a moving belt carrier and electrostatic means for applying grains and removing grains from the surface.

FIGURE 2(a) and FIGURE 2(b) together show in elevation and plan a schematic illustration of one type of magnetic delay mechanism for use with a surface carrier type of scanner such as that in FIGURE 1.

Figure 5:
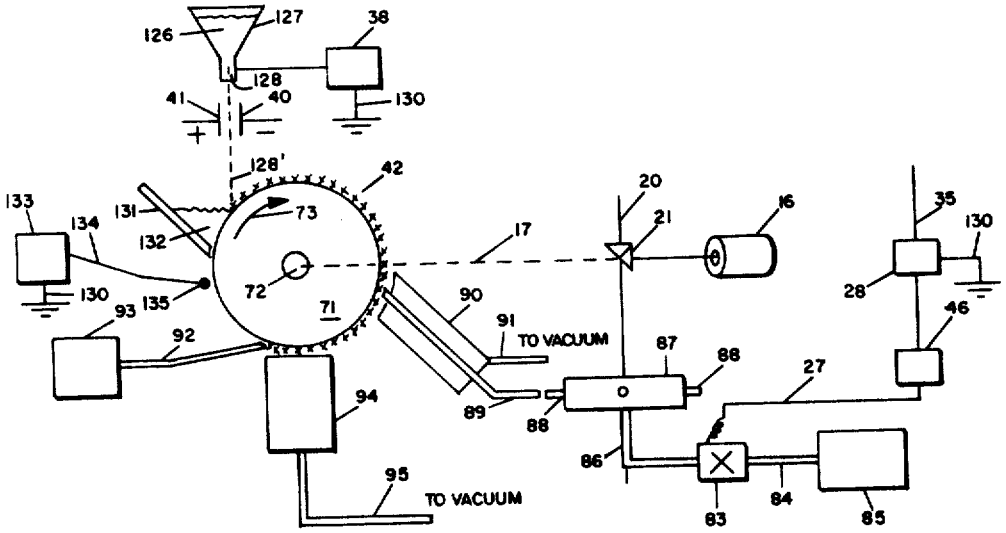
Figure 5B:
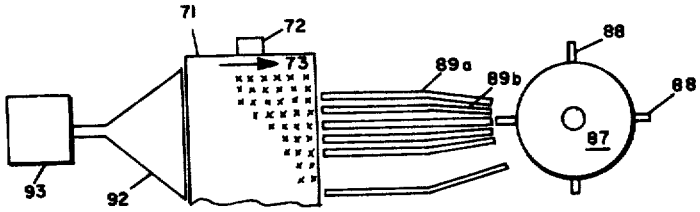

FIGURE 5(a) and FIGURE 5(b) together show a schematic illustration in elevation and plan view of another embodiment of this invention including electrostatic attachment of grains and pneumatic removal of grains.

Figure 6A:
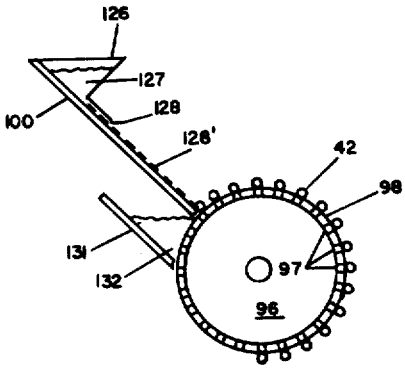
Figure 6B:
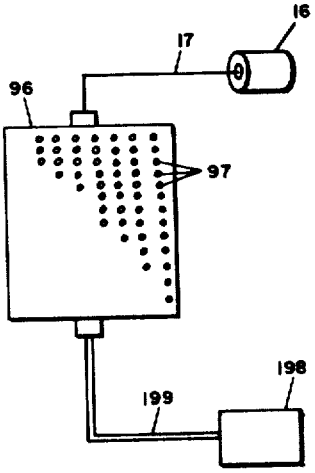

FIGURE 6(a) and FIGURE 6(b) together show a schematic illustration of a drum carrier adapted for pneumatic attachment of grains.

Figure 7:
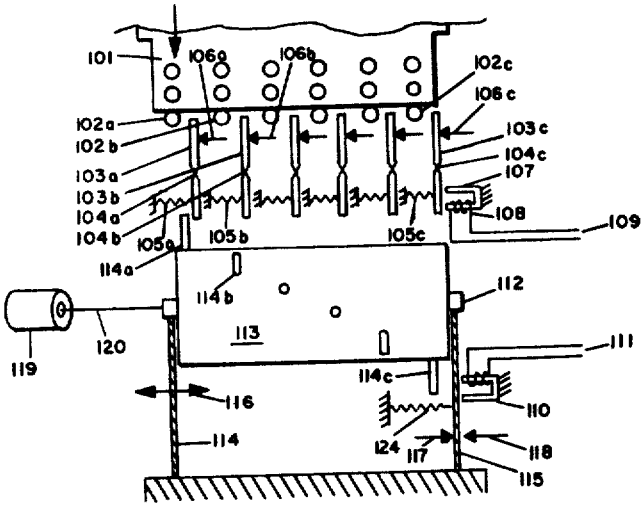

FIGURE 7 illustrates a detail of an electromechanical means for removal of grains from the carrier surface.

In FIGURE 1, I show a belt 10 of substantial width and made of insulating material such as a plastic or rubber composition. The belt 10 surrounds a pair of drums, cylinders or rollers 11 and 12 rotating in the direction of the arrows 13, on shafts 14 and 15, respectively. The axes of the two drums are parallel and the edges of the drums are collinear. The drums are driven by motor 16, preferably at constant speed, through drive mechanism 17 and 18. Thus the belt 10 is carried around the drums at constant speed.

The motor 16 and drive mechanism also drive a multi-sided mirror 19 fastened to shaft 20 driven from 17 by gears 21. Shaft 20 is also connected in insulating coupling 22 to shaft 23 carrying rotating contractor 24 carrying contact points 25.

The granular material *126* [26] to be inspected and sorted is carried in hopper container *127* [27], and permitted to fall through the slot *128* [28] in the bottom, along plane *128'* [28'] to contact the surface 36 of belt 10. What material *126* [26] does not stick at contact with the belt falls into the hopper *132* [32] formed against the belt by wall *131* [31]. Thus the material in the hopper is in a continuing contact with the surface 36 of belt 10. A source of high voltage direct current *133* [33] is grounded by lead 130 and connected by conductor *134* [34] to sparking or corona discharge conductor *135* [35]. This may be a small diameter metallic wire mounted on insulators so as to be closely spaced and parallel to the surface 36 of belt 10. The action of the high voltage on wire *135* [35] is to create an electrical discharge from the wire, creating ions in the air around the wire and applying an electrical charge to the surface of the belt.

The insulating materials *126* [26] of which the grains are formed can be charged electrically by applying a high voltage from source 38 grounded by lead 130, through conductor 37 to the hopper *127* [27]. If the rollers 11 and 12 (of conducting material) are grounded by leads 130, then the grains falling from the high potential of *127* [27] to ground will acquire a charge. This charge should be opposite in polarity to the charge on the belt, and the charged grains will adhere to the surface of the belt, as at 42.

The lamp 29 and optical system 30 form a beam of light 31 which impinges on a rotating mirror 19 and is reflected as beam 32 which focusses as a spot on the *layer of* [surface of belt and] grains 42. The sweep of the spot across the *layer* [belt] due to the rotation of the mirror permits momentary illumination of each grain along a scan line substantially perpendicular to the direction of motion of the belt. The rate of drive of belt and sweep of spot are so controlled and synchronized that successive sweeps of the light spot are close enough to each other so that all *rows of* grains on the belt are scanned as the belt passes.

A light reflecting and integrating sphere 33 with photoelectric cell 34 is shielded from the direct beams 31 and 32, but is exposed to the scan line of the spot of beam 32. Thus the light scattered by the grains and gathered by 34 and converted to potential is transmitted by conductor 35 to control means 28. This potential will be a function of the instantaneous color and reflectivity of the material 26. A light filter 34' may be used as necessary to better delineate the response of the scanner as between good and bad grains. The instantaneous voltage applied to the control means 28 will be indicative of the character of the grain under the spot at the instant. For example, if the good grains are light colored, and it is desired to reject the dark colored grains, then the control unit 28 can be set to reject those grains for which the voltage output of 34 is less than a predetermined minimum value.

Figures 1A, 1B:
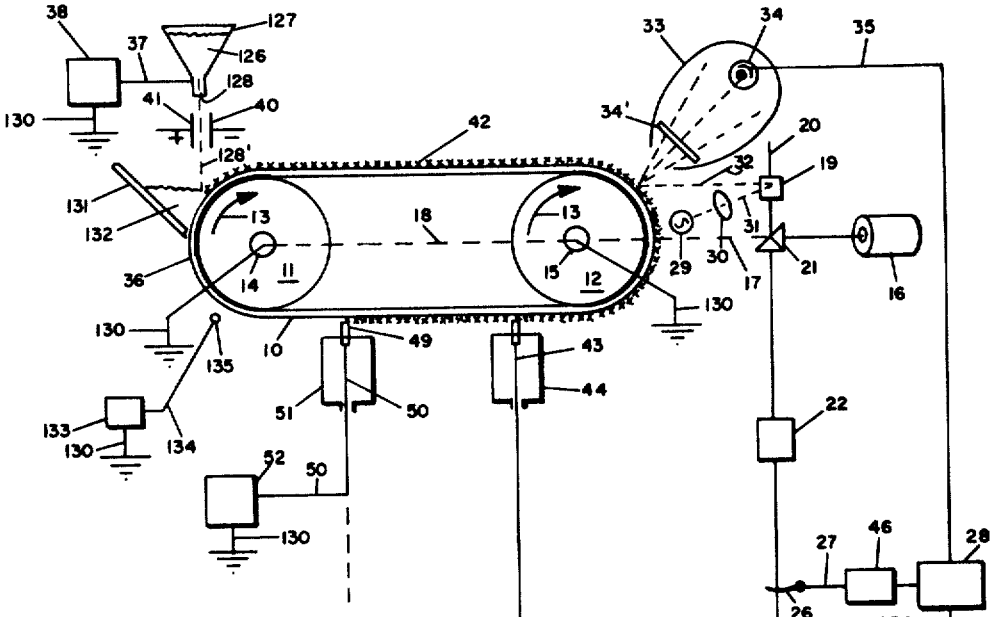

Exposed to the grains on the surface of the belt is an electrical rejector system comprising a multiplicity of pointed electrodes 43 arranged in a line as shown in FIGURE 1b. The line of points 43a, 43b, etc., is parallel to the scan line of beam 32. Surrounding electrodes 43 is a container 44 into which rejected grains can fall or be attracted. Each of the electrodes 43 are connected by wires 45 to terminations 47 molded into insulating block 48. The terminations 47a, 47b, etc., are formed in a circle, substantially equal in diameter to the diameter of the tips of the wires 25 mounted in the circular insulating block 24 rotating about its center on shaft 23 in synchronism with the mirror 19. This synchronism must be in angular rate of rotation. Since the scan of the beam 32 is at twice the angular rate of the mirror 19, there must either be twice as many scanning elements 25 as there are faces to the mirror 19, or the coupling 22 must include an appropriate step up in speed.

The scan line of the beam 32, while generally transverse to the direction of motion of the surface, is not exactly perpendicular. For as one scan across the surface is completed, the surface will have advanced longitudinally by the spacing between scan line. So the scan line is tilted to the perpendicular, and the greater the spacing between scan lines, the greater the speed of the belt, the more tilted is the scan line. This same applies to the rejection line, which must be parallel to the scan line. Although these lines are not rigorously perpendicular to the motion of the surface, for convenience we will indicate this by stating that they are "substantially" perpendicular to the direction of motion of the surface.

It will be clear that as the scanning beam "sees" a grain of a color to be rejected, and the voltage indicative of this is sent to the control unit 28, the control unit must convert this signal to an appropriate rejection voltage, delay this voltage by means of delay unit 46 and then apply it to the brush 26, shaft 23, and wires 25. If proper synchronism and timing is made, the defective grain will be under the proper electrode 43 when the wire 25 is contacting the proper lead 47 as the rejection signal is applied to the brush 26. Whether wires 25 actually contact the terminals 47 depends on the design of the system. It is possible to use a high enough voltage to form a discharge between 25 and 47 without metallic contact.

*It will be clear that for the sorting system of this invention to work, both the inspection means and the rejection means must be able to "see" each grain in the moving array of grains on the belt. This means that the array of grains must be in the form of a moving monolayer of grains of the desired form or shape of array. The electrostatic means of attaching the grains to the belt tends to form such a monolayer. The grains which might form a second layer are repelled by the electrostatic charge on the first layer of grains. However, any desired means for forming a monolayer array of grains can be used.*

The delay unit 46, while shown as a separate part for convenience, can be part of control means 28, or may be inserted in the input lead 35 of signal to the control, or inserted in the output lead from the control to the rejector. It will be clear that in any electromechanical system involving relays, valves, etc., there will be some delay in the normal operation of these elements. If so, this delay must be taken into account as part of the total delay 46. The greater the separation in space between the scan line and the rejection line, the greater the delay required in unit 46. If the rejection line can be placed very close to, or superposed on the scan line, then the normal delays in the mechanism elements may be sufficient. If not, then additional intentional delay must be introduced by element 46. Although the time delay between the scan signal and delayed rejection operation may be distributed between the scanning, control and rejection means, for convenience it will be considered as though all the delay will be concentrated in the control means, and more particularly in the delay means 46, which forms part of the control means.

It may be possible to arrange an assembly in which the scan line and rejection lines are superposed. More generally, however, depending on the difference in space between the scan and rejection lines (and the rate of movement of the surface) there will be a substantial magnitude of time delay between the scan signal and rejection signal. This time delay can be entirely electrical such as by the use of condenser-inductance delay lines, or electromechanical, such as by the use of a commutator with many narrow segments each one connected to a small capacitance to ground. One brush contacting the commutator is input, and a pulse on the brush charges the condenser connected at that moment to that brush. Sometime later as the commutator rotates, a second brush contacts the same charged condenser and takes off the charge.

Figure 2A:
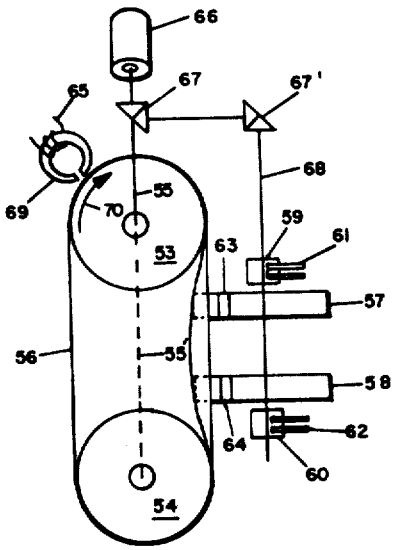
FIGURE 2(c) is a schemaic view of an embodiment of the magnetic delay means in which the magnetizeable surface is a surface of revolution of such a contour that the intersection of the surface with a diametral plane is a portion of a circle.
Figure 2B:
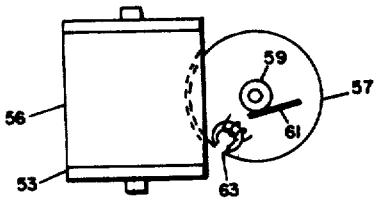

Another possible delay system comprises a tape or drum or other moving magnetic element on which are placed in spaced relation a magnetic recording head and a magnetic pickup head. Of course, a demagnetizing head must be used to demagnetize the magnetic element ahead of the recording head. However, there is particular advantage in using a magnetic delay system such as that shown in FIGURE 2. This is one embodiment of a number of different arrangements based on the same principles. I show two spaced parallel drums 53 and 54 carrying a continuous magnetic tape 56. The drums are driven by motor 66 through drive means 55 and 55' at constant speed. As shown in FIGURE 2*b* the tape is of considerable width, and in the space between the rollers it can be formed into an element of a cylinder, as is well known in the art. The radius of the cylindrical element formed by the belt is the same as the radius of the wheels 57 and 58 which carry magnetic recording head 63 and pickup head 64. The wheels 57 and 58 are also driven by motor 66 through gears 67 and 67' in the proper ratio so that the rates of scan of the record and pickup heads and the speed of the tape 56 are all properly related to the speeds of the moving surfaces, scanner and rejector of FIGURE 1*a*. Connections to the heads 63 and 64 are made through collector rings 59 and 60 and brushes 61 and 62, respectively. Also, it is necessary to demagnetize the tape 56 such as by the demagnetizing head 69 with winding 65 to which an appropriate A-C current is applied.

Figure 2C:
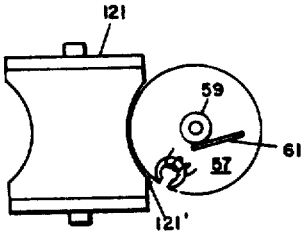

Of course, it is possible to replace the two drums 53 and 54 and tape 56 with a single drum of appropriate surface contour, and covered with magnetic material. The surface of this drum would be such that the contour of the surface at the intersection with a diametral plane would be substantially circular and of radius substantially equal to that of the wheels 57 and 58. This is shown in FIGURE 2*c*. The wheels 57, 58, and heads 63 and 64 would thus be applied to the surface of the drum 121, but preferably spaced a small air gap 121' away to prevent rubbing and wear of the heads and surface magnetic coating.

This particular embodiment of a magnetic time delay system is particularly useful since it is a true analog of the surface, scanning and rejecting system of FIG. 1. Also, if it is desired to select the grains into more than two categories to pass or reject, this can be accomplished by introducing the proper control voltage selector in 28, adding another rejector 43–44 spaced farther along the surface, and adding a second pickup wheel and magnetic pickup head to the delay device of FIGURE 2.

Referring again to FIGURE 1, the electrode 49 comprises a thin linear conductor which extends completely across the surface. Surrounding this electrode is a container 51 to catch and hold the grains, which have not been rejected by the electrodes 43 and are rejected by the electrode 49. By applying a high potential from source 52 through conductor 50, the electrode 49 will attract to itself and the container 51 the remaining grains on the surface. This leaves the surface in condition for the spraying on of charge by electrode *135* [35] and a repetition of the process of scanning, rejection of defective grains and removal of perfect grains.

One way of ionizing the grains *126* [26] that fall from the hopper onto the belt is by applying a high voltage from source 38 to the hopper *127* [27]. The grains leaving the hopper carry a charge with them. They can fall from the hopper or be driven or blown from the hopper.

Another way to place a charge on the grains as they fall from the hopper to the belt is to pass them through a space between electrodes 40 and 41 between which an electrical discharge is taking place. This electrical discharge set up by a power source not shown produces ionized air molecules or ions which will attach themselves to the surface of the insulating grains. The grains thus become charged due to the addition of the ionized air molecules.

Figure 3:
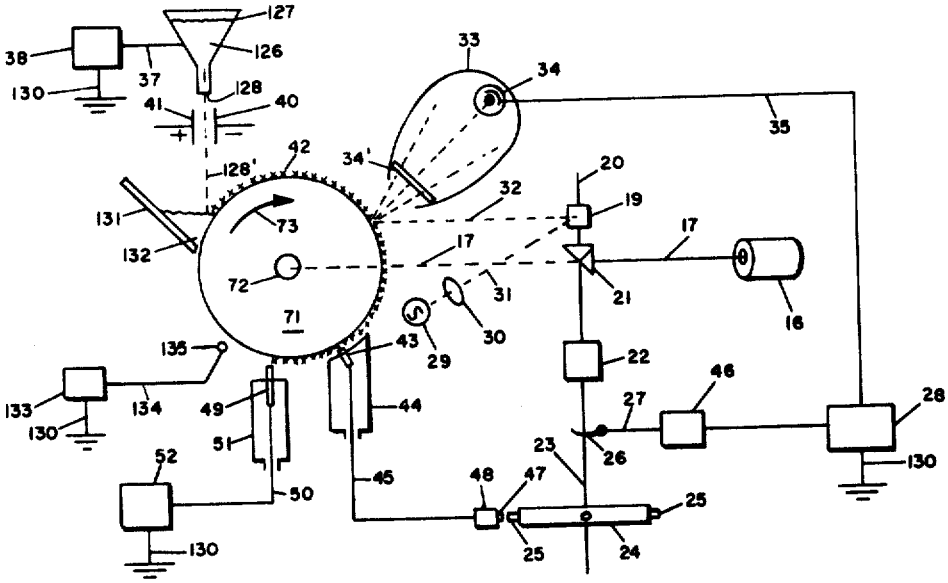
FIGURE 3 is a schematic illustration of another form of scanner-examining-sorting system using a rotating drum.

In FIGURE 3, I show another embodiment in which the moving surface is not a continuous belt as in FIGURE 1, but simply the surface 10 of a rotating cylindrical drum 71 rotating about shaft 72 in the direction 73. In this figure, I have indicated how all of the essential parts of the system shown in FIGURE 1 would fit about the drum 71. As in the case of the magnetic delay line of FIGURE 2*c*, the surface of this drum need not be a right circular cylinder but can be a surface of revolution generated by a circle whose center is outside of the surface. It might be described as having the shape of an hour glass, for example, with a longitudinal element of the surface a circle of substantially the same diameter as that of the wires 25 of contactor 24 of FIGURE 1. Thus the electrodes 43, wires 45, terminations 47, and molded unit 48 can be eliminated. In this case the contour of an element of the surface, and of the grains on the surface along a scan line substantially perpendicular to the direction of motion of the surface, would be the contour of the terminations 47. The rotating wires 25 would be placed in close proximity to the surface and apply their potential direct to the grains. With this kind of a surface, the optical scanning beam would operate more precisely, making the progress of the spot along scan lines directly proportional to the angle of sweep of beam 32.

Figure 4:
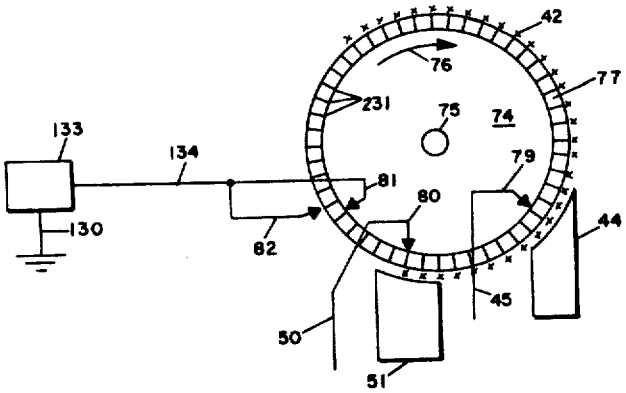
FIGURE 4 illustrates a detail of a particular type of drum carrier designed for electrostatic attachment and removal of grains.

In FIGURE 4, I show another way to construct the moving surface. Here the cylinder 74 is hollow and the surface comprises a thin shell 77 made of insulating material through which a multiplicity of thin conducting rods or wires *231* [131] pass. These wires can be inserted into holes pierced through the shell, or the shell can be molded around the wires. The wires are preferably arranged in a regular two-dimensional array with the longitudinal dimension arranged perpendicular to the scan line. This type of surface is ideal where the grains are of substantial size so that the spacing between wires is roughly equal to the diameter of the grains. Thus each wire can attract and hold one grain.

The wires can be charged from the inside of the shell by electrode 81 or from the outside by electrode 82. These can either contact the wires directly or charge can be sprayed onto the surface and wires by the same means as in FIGURE 1. Similarly the grains can be rejected by contacting or spraying electrodes 79 in the inside, one opposite each of the wires in the scan line. All of the remaining grains are driven off the surface by applying a potential to the wires 80 similar to the charge on the grains. If desired, the switching of rejection voltage to various electrodes of the series 79 can be by a matrix of diodes or by the use of electronic switching tubes such as the Beam-X tube, as is well known in the art, in place of the commutator shown in FIGURE 1.

The grains adhering to the surface of the tape, belt or drum can be removed by mechanical or electromechanical means. One such embodiment is shown in FIGURE 5. Here the control means 28 and delay means 46 provide a pulse of current through line 27 to operate a solenoid valve 83 in a pipe 84 from a source of compressed air 85. When the valve is momentarily open, a pulse of air is sent by pipe 86 to the rotating element 87 driven by the motor 16 in synchronism with the drum 71 and rotating mirror. This rotating element 87 *which can be thought of as a rotating nozzle system* acts as a distributor to apply the pulse of air through the opening 88 to any desired one of the pipes 89a, 89b, etc. these lie in a plane which intersects the surface of the drum along a scan line, and by the timing of the pulse of air any one of the grains along the scan line can be removed from the surface and collected in container 90. This collection can be facilitated by applying a partial vacuum to pipe 91 connected to the container 90. In a similar manner a continuing flow of air from container 93 out of a long slotted pipe 92 completely covering the width of the surface will serve to remove all of the grains remaining on the surface after the rejector has operated. These grains are collected in container 94, aided if necessary by a partial vacuum applied to the container 94 through pipe 95. Here again, as in the case of the electrostatic rejection of FIGURE 1, by properly shaping the drum surface, the air pulse mechanism 87 can be moved close to the surface of the drum and the outlet pipes can operate directly on the grains on the surface.

If the grains are of substantial size, such as peas, beans, corn, etc., it may become more practical to hold them to the drum surface by vacuum. In this case the drum surface can be a thin shell 98, FIGURE 6, perforated with a two-dimensional array of small openings 97. These are arranged along scan lines of the surface. The drum or cylinder is made airtight except for these perforations 97. A vacuum is applied through a line *199* [99] to a swivel connection at the axis of rotation and connected to a vacuum chamber *198* [98].

The grains can be applied to the surface by passing them through a slot *128* [28] in a bin *127* [27] permitting them to roll down the surface 100 to the drum. Those that do not immediately become attached to the drum surface fall through the space between the surface and the drum into the hopper formed by wall *131* [31]. Here they will maintain a supply *132* [32] in the space formed between the drum surface and the wall *131* [31]. Thus, as each opening passes this space it will pick up a grain as the surface rotates. These can be scanned and rejected in accordance with the apparatus of FIGURES 3 and 5, for example, or other equivalent means.

*In the embodiments of FIGURES 4 and 6, where the drum is prepared with particular holding or attaching means, such as the wires 131 or the openings 97, it might be convenient to place these means in a regular two dimensional array of rows and columns oriented along the expected scan lines. However, for the embodiments of FIGURES 1 and 3, it is difficult to arrange the grains in such an array.*

There are other ways in which a given grain can be removed from the drum surface, such as by electromechanical means. In FIGURE 7, I show in schematic fashion in plan view a portion of the drum surface 101 carrying grains 102a, 102b, 102c, etc. These might, for example, be fairly large grains held to the surface of the drum by vacuum. In cooperation with the drum are a multiplicity of levers 103a, 103b, 103c, etc., to rest against stops 106a, 106b, 106c, etc. If these levers are pulled to the side, such as, for example, 103c by the attraction of the electromagnet 107 having coil 108 with leads 109, then, energizing the leads 109 with sufficient current will cause the lever to be attracted against the pull of spring 105c and to displace grain 102c from its attachment to the drum surface and cause it to fall into a proper receptacle.

It is also possible, by the use of one electromagnet 110, to displace the assembly 112. This assembly comprises a rotating drum 113 driven by motor 119 through drive means 120 to be in synchronism with the scan sweep. This assembly is mounted on spring members 114 and 115 so as to have freedom to move in the direction of the arrows 116. It is constrained to move only between the stops 117 and 118 and is held against 117 by the spring 124. The rotating drum 113 has pins 114a, 114b, 114c, etc., arranged longitudinally and circumferentially around its surface such that at successive intervals of time different pins come into operative relation with the levers 103. Thus, depending on the time that magnet 110 is energized one or another of the multiplicity of levers will be operated to selectively remove a specific one of the grains 102.

The assembly 112 provides an electromechanical rejection system. The use of separate magnets 107 on each of the levers will still require an electrical commutator to synchronously select the proper magnet and lever.

While I have described and pointed out the fundamental novel features of my invention and have described it in connection with a number of modifications, it will be understood that various changes, substitutions, additions, and omissions in the form and detail of the devices illustrated and in their operation may be made by those skilled in the art without departing from the spirit of my invention. For example, no specification is made as to the width of the moving surface. Normally, it would be advantageous to make this as large as possible. However, there are times when a narrow drum or wheel might better suit the requirements. *Also, it is contemplated that the particles will be modified in physicochemical properties so as to make them susceptible more readily to detection by the said inspection means.*

It is my intention, therefore, to be limited only as indicated by the scope of the following claims.

I claim:

1. An examining-sorting system for granular materials comprising in combination

[(1) a moving surface, comprising a surface of rotation for which the intersection of said surface with a diametral plane is a portion of a circle, concave outward from the axis of rotation,]

(*1*) *surface means for forming a moving two-dimensional monolayer array of granular materials,*

[(2) means for removably and temporarily holding to said surface in a two-dimensional array a multiplicity of grains of material,]

(*2*) *means for removably and temporarily holding a multiplicity of grains of material in said monolayer array,*

(3) said two-dimensional array of grains comprising substantially a pattern of columns and rows, said columns being oriented substantially in the direction of *travel of said array* [motion of said surface] and said rows being oriented substantially perpendicular to the direction of *travel of said array* [motion of said surface], (4) inspection means for examining sequentially each grain in a row and sequentially each row over said *array* [surface] for at least one physico-chemical property, (5) said inspection means *rotating in a plane substantially perpendicular to said array, and* adapted to scan along a line coincident sequentially with each of said rows of grains, (6) *a single rotating* grain rejection [means comprising] electrophysical means for displacing *any grain in a row of grains* [at least one grain] of said material from said *array* [surface], (7) said rejection means constrained to *operatively scan in a plane substantially perpendicular to said array, and* [operate] along a rejection line coincident sequentially with each of said rows of grains, (8) said *rotating* inspection means and said *rotating* rejection means synchronized with each other *in their rotation* and with the movement of said *array* [surface], (9) control means responsive to said *inspection* [inspecting] means,

(10) said rejection means responsive to said control means,

(11) and means for removing all said grains from said *monolayer array* [surface], whereby, when said inspection means finds a grain of anomalous property said control means will control said rejection means to remove said anomalous grain.

2. An examining-sorting system as in claim 1 in which said control means includes magnetic time delay means comprising a magnetizable surface moving in synchronism with the grain-carrying surface, a transversely moving magnetic recording head and a transversely moving pickup head each synchronized respectively with said scanning and rejection means.

3. An examining-sorting system as in claim 1 in which said grains are of substantially uniform electrostatic properties, and said means for removably and temporarily holding said grains to said surface comprises: means for placing an electrostatic charge of one polarity on said surface, means for charging each of said grains with a charge of substantially equal magnitude and of opposite polarity to that of said surface, and means for applying said charged grains to said charged surface, whereby said grains will be removably attached to said surface.

4. An examining-sorting system as in claim 3 in which said surface is nonconducting and said charge is placed on said surface by an electrical discharge.

5. An examining-sorting system as in claim 3 in which said surface comprises a cylindrical shell of nonconducting material containing a multiplicity of short conducting wires perpendicular to and extending substantially through said surface.

6. An examining-sorting system as in claim 5 in which said grains are rejected and removed from said surface by a potential applied to at least one of said short conducting wires on the side of said surface opposite to said grain, said potential being of the same sign as the charge on said grain.

7. An examining-sorting system as in claim 3 in which all said grains are charged by being passed through a space containing ionized air molecules.

8. An examining-sorting system as in claim 3 in which said grains are charged by being delivered against said surface from a conducting container charged to a high potential compared to the potential of the said surface.

9. An examining-sorting system as in claim 3 in which said grains are rejected and removed from said surface by means of an electrode placed above said surface and close to said grain, said electrode being charged momentarily with an electrical potential of the same sign as and of higher potential than said surface.

10. An examining-sorting system as in claim *19* [1] in which said inspection means and said rejection means are adapted to scan said grains in a substantially diametral plane.

11. An examining-sorting system as in claim 10 in which said rejection means comprises a rotating nozzle system the plane of rotation of which is in said diametral plane of said rotating surface [and the axis of rotation of said nozzle system is substantially at the center of said circle].

12. An examining-sorting system as in claim 10 in which said rejection means comprises a rotating electrode system connected to a pulsed high voltage supply, the plane of rotation of said electrode system is in said diametral plane of said rotating surface [, and the axis of rotation of said electrode system is substantially at the center of said circle].

13. An examining-sorting system as in claim 1 in which said inspection means comprises at least one *stationary* light source and one *stationary* photoelectric detector with at least a portion of the light path between said source and said detector adapted to sweep substantially in a scan plane passing through one of said rows.

14. An examining-sorting system as in claim 13 in which said light path includes a reflection from a mirror constrained to rotate about an axis perpendicular to said scan plane.

15. An examining-sorting system as in claim 1 in which said rejection means comprises a rotating nozzle system having at least one nozzle supplied with gas under pressure, the plane of rotation of said system perpendicular to said *array* [surface] and the stream of gas issuing from said nozzle adapted to be applied sequentially to each of said grains in a row and sequentially to all rows on said *array* [surface].

16. An examining-sorting system as in claim 15 in which said stream of gas from said nozzle is conducted to the grains on said surface by a multiplicity of *stationary* tubes.

17. An examining-sorting system as in claim 16 in which said multiplicity of tubes are surrounded by a partially evacuated space whereby any grains dislodged from said surface by said stream of gas are carried to said evacuated space and conducted to an appropriate receptacle.

*18. Apparatus as in claim 1 in which said surface means comprises a surface of the form of a hypothetical surface generated by a line rotating about an axis from which it has a fixed spacing.*

*19. Apparatus as in claim 18 in which said line is an arc of a circle concave away from said axis.*

*20. An examining sorting system as in claim 2 in which said moving magnetizeable surface comprises a surface of rotation for which the intersection of said surface with a diametral plane is a portion of a circle, concave outward from the axis of rotation.*

*21. An examining-sorting system for granular materials comprising in combination,*

*(1) means for forming a moving two-dimensional array of granular particles,*

*(2) said two-dimensional array of grains comprising substantially a pattern of columns and rows, said columns being oriented substantially in the direction of motion of said array and said rows being oriented substantially perpendicular to the direction of travel of said array,*

*(3) inspection means for examining sequentially each grain in a row and sequentially each row over said array for at least one physico-chemical property,*

*(4) said inspection means rotating in a plane substantially perpendicular to said array, and adapted to scan along an inspection scan line coincident sequentially with each of said rows of grains,*

*(5) a single rotating grain rejection electrophysical means for displacing any grain in a row of grains of said material from said array,*

*(6) said rejection means constrained to operatively scan in a plane substantially perpendicular to said array, and along a rejection scan line coincident sequentially with each of said rows of grains,*

*(7) said rotating inspection means and said rotating rejection means synchronized with each other in their rotation and with the movement of said array,*

*(8) control means responsive to said inspection means,*

*(9) said rejection means responsive to said control means, and*

*(10) means for removing all said grains from said array.*

*22. Apparatus as in claim 21 in which said means for forming a moving monolayer of granular materials comprises a moving surface, said surface comprising a surface of revolution to which said grains are removably and temporarily held, said inspection means and said rejection means adapted to scan in diametral planes.*

*23. An examining-sorting system for granular materials comprising,*

*(1) means for forming a moving two-dimensional monolayer array of granular particles,*

*(2) grain inspection means comprising a single rotating optical scanning beam and photosensitive sensor means, the plane of rotation of said beam substantially perpendicular to said array, and intersecting said array along a first scan line,*

*(3) grain rejection means comprising a single rotating electrophysical scanning grain rejection means, said rejection means adapted to interact with said array in a plane substantially perpendicular to said array, and intersecting said array along a second scan line,*

*(4) the position of said second scan line on said array substantially coincident with the position of said first scan line on said array after a predetermined time of movement of said array,*

*(5) said rotation inspection means and said rotation rejection means synchronized with each other in their rotation and with the movement of said array,*

*(6) control means responsive to said inspection means, and*

*(7) said rejection means responsive to said control means,*

*whereby when in a scan by said inspection means along said first scan line on said array a defective grain is found, said inspection means will cause a signal to be sent to*

*said control means, which will send a control signal to said rejection means after a predetermined delay, while said rejection means is scanning along said second line, which is now coincident with said first line, so that said rejection means will reject said defective grain when said rejection scan reaches the position of said defective grain.*

*24. Apparatus as in claim 23 in which said first scan line is substantially circular, the axis of rotation of said inspection means is approximately at the center of said circle, said second scan line is substantially circular and the axis of rotation of said rejection means is approximately at the center of said circle.*

*25. Apparatus as in claim 23 in which said second scan line departs from a circle and said system includes subsidiary coupling means interposed between said rotating electrophysical rejection means and said array, which coupling means presents at its first end means responsive to the circular scan of said rejection means, and which has at its second end means adapted to the actual shape of the said second scan line on said array.*

*26. Apparatus as in claim 25 in which said second scan line is a straight line.*

*27. Apparatus as in claim 25 in which said coupling means comprises an assembly including,*

*(1) a multiplicity of conductors,*

*(2) an assembly of conductor terminations at a first end of said conductors arranged in a circular pattern of a radius related to the radius of said rotating rejection means,*

*(3) an assembly of conductor terminations at the second end of said conductors arranged in a pattern corresponding in shape to the said second scan line on said array.*

*28. Apparatus as in claim 25 in which said coupling means comprises an assembly including,*

*(1) a multiplicity of small diameter tubes,*

*(2) an assembly of tube terminations at a first end of said tubes arranged in a circular pattern of a radius related to the radius of said rotating rejection means, and*

*(3) an assembly of tube terminations at the second end of said tubes arranged in a pattern corresponding in shape to the said second scan line on said array.*

*29. Apparatus as in claim 23 in which said means for forming a moving two-dimensional monolayer array of granular particles comprises a moving solid surface to which said array is removeably attached.*

*30. Apparatus as in claim 29 in which said surface is a surface of the form of a surface generated by a line rotating about an axis from which it has a fixed spacing.*

*31. Apparatus as in claim 29 in which said moving surface is the surface of an endless belt moving over two parallel cylindrical rollers.*

*32. Apparatus as in claim 23 in which said rejection means is electrostatic.*

*33. Apparatus as in claim 32 in which said rotating electrophysical means comprises a rotating electrode system.*

*34. Apparatus as in claim 23 in which said rejection means is pneumatic.*

*35. Apparatus as in claim 34 in which said rotating electrophysical means comprises a rotating nozzle system.*

References Cited

The following references, cited by the Examiner, are of record in the patented file of this patent or the original patent.

UNITED STATES PATENTS

| | | | |
|---|---|---|---|
| 668,792 | 2/1901 | Black | 209—128 |
| 1,116,951 | 11/1914 | Sutton | 209—128 X |
| 2,646,880 | 7/1953 | Frankel | 209—111.6 |
| 2,717,693 | 9/1955 | Holmes | 209—111.5 |
| 2,758,712 | 8/1956 | Linderman | 209—111.5 |
| 3,058,588 | 10/1962 | Palmquist | 209—111.5 X |
| 3,095,090 | 6/1963 | Duran | 209—111.6 |

FOREIGN PATENTS 809,744 12/1936 France.

OTHER REFERENCES

"Food Engineering," vol. 24, No. 7, July 1952, pages 53 and 54.

M. HENSON WOOD, Jr., *Primary Examiner.*

R. A. SCHACHER, *Assistant Examiner.*